Jan. 14, 1958 R. R. SMITH 2,819,988
REGENERATED CELLULOSE CORDAGE
Filed June 2, 1955

COATING
- 50-75% ASPHALT, PYROGENOUS ASPHALT OR COAL-TAR PITCH.
- 20-40% ROSIN OR MODIFIED ROSIN.
- 6-20% HARD WAX OR WAX-LIKE SUBSTANCE.

United States Patent Office 2,819,988
Patented Jan. 14, 1958

2,819,988
REGENERATED CELLULOSE CORDAGE

Robert R. Smith, Wilmington, Del., assignor to American Viscose Corporation, Philadelphia, Pa., a corporation of Delaware Application June 2, 1955, Serial No. 512,857

14 Claims. (Cl. 117—145)

This invention relates to cordage and more particularly to rayon baling twine.

Heretofore, twine spun from natural sisal fibers has been the primary cordage employed in automatic baling machines, such as the agricultural equipment used to bale hay or straw. Resilience, relatively high strength, low cost, as well as other advantages have contributed to the almost universal acceptance of sisal baling twine. Inherent in its use, however, are certain deficiencies including lack of uniformity in knot strength which causes a high percentage of broken bales. This disadvantage is somewhat overcome by increasing the weight and hence the bulk of the twine per unit length, but such practice has obvious drawbacks and limitations. In addition to lack of uniformity, sisal is an imported fiber, the price of which is also subject to wide fluctuations.

Rayon, on the other hand, being synthetic fiber can be manufactured with quite uniform physical characteristics such as tenacity and elongation at breaking strength but is devoid of certain properties, e. g., stiffness, water repellency and low knot slippage that are essential in a satisfactory twine for baling hay, i. e., alfalfa, soya beans, clover, etc., and straw with conventional equipment.

In early attempts to use a rayon strand as a baling twine, it was demonstrated that the strand had flexibility, exceptional uniformity, and much greater strength per unit denier than sisal, but a rayon twine having adequate strength for baling was substantially smaller in cross section than the sisal twine in current use, and much too limber to function properly in the knotter of a baler. Furthermore, a rayon strand which had not been pretreated for use as a baler twine was found to have undesirable elongation and tended to fray badly as it was pulled through between the bales. Fraying, of course, reduces the strength of the strand and weakens the knots.

An object of the present invention, therefore, is the manufacture of rayon baling twine which has good moisture resistance and/or wet strength, is low in cost, and has those properties which allow it to be satisfactorily used in automatic balers. Objects ancillary to the foregoing object, in adapting a rayon strand suitable for use as a baling twine, are to render it abrasion resistant, moisture resistant, non-injurious to workers' hands, and to provide it with high knot strength. Other objects and advantages are apparent from the following description and examples.

Figure 1:
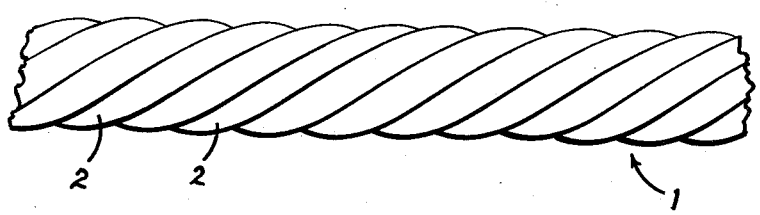
Figure 1 is an elevational view of baling twine.
Figure 2:
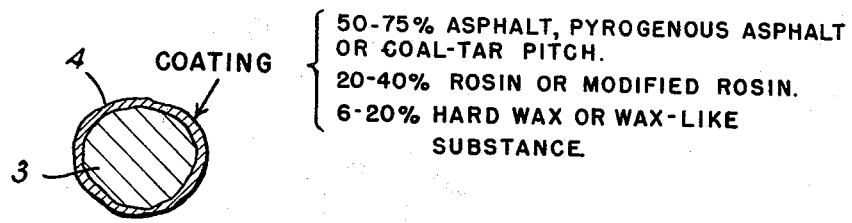
Figure 2 is a sectional view at an enlarged scale of a filament for baling twine made in accordance with this invention.

It has now been found that these objects may be accomplished by impregnating regenerated cellulose yarn with a composition comprising from 50 percent to 75 percent by weight of an asphalt or a coal-tar pitch, from 20 percent to 40 percent by weight of rosin or modified rosin and from 6 percent to 20 percent by weight of a hard wax or wax-like substance.

The asphalts and coal-tar pitches employed in the present invention have softening points from 140° F. (60° C.) to 225° F. (104° C.) and preferably from 165° F. (74° C.) to 210° F. (99° C.) as determined by the ring and ball method in accordance with the American Society for Testing Materials Procedure D36–26. The penetration or hardness of a given asphalt or pitch will, of course, vary indirectly as to the softening point. Within the above stated softening point ranges, the penetration of a steel needle with a 100 gram load at 77° F. (25° C.) in 5 seconds may vary from about 5 tenths to 40 tenths of a millimeter in compliance with the specification of ASTM D5–49.

Both naturally occurring asphalts, and pyrogenous asphalts, characterized by dark color and non-volatility and composed principally of hydrocarbons substantially free from oxygenated bodies, are operative in the present invention. The pyrogenous asphalts include residues obtained from the distillation, blowing, etc., of petroleum, for example: residual oils, such as are produced by steam distillation of asphaltic petroleum, dry or steam distillation of semi-asphaltic petroleum or dry distillation of non-asphaltic petroleum; blown asphalts, such as are produced by blowing air through heated residual oils; residual asphalts, such as are produced by steam distillation of semi-asphaltic and asphaltic petroleums; sludge asphalts, such as are produced from the acid sludge obtained in the purification of petroleum distillates with sulfuric acid; cut back asphalts, and the like.

The coal-tar pitches obtained by the distillation of coal tar, having softening points within the above defined ranges, are preferred in this invention because they contain aromatic organic compounds such as polystyrene which impart mildew and vermin resistance to the finished twine. Coal-tar pitches which are used in roofing compositions are examples of the preferred bituminous materials.

Colophony or rosin which comprises chiefly abietic acid, is incorporated in the finish composition described herein to prevent slippage of knots tied by the baler. The modified rosins such as ester gum, maleic anhydride-modified rosin, and rosin esterified with pentaerythritol are preferred because of their stability.

A hard wax or wax-like substance having a hardness and a melting point about the same as the hard wax imparts hardness to the finish composition and prevents the treated yarn from sticking to the discs of the knotting mechanism. Carnauba wax has a softening point of from about 80° C. to 88° C., depending on the particular source and grade. This wax has a hardness of the order 0.5 of a milligram penetration by a steel needle with a load of 150 grams at 25° C. in 60 seconds in accordance with ASTM D5–49. Other hard material and synthetic waxes may be substituted for all or part of the carnauba wax. For example, up to 50 percent by weight of ozokerite, candelilla wax or Japan wax may be substituted for carnauba wax. Mineral waxes such as obtained from the petroleum refining process, e. g., paraffin wax may be used. Hydrogenated mineral and vegetable oils such as linseed oil, cotton seed oil, soya bean oil, tung oil, and the like characterized by carbon-to-carbon unsaturation before hydrogenation, are preferred substitutes for carnauba wax in the present invention since these oils can be hydrogenated to any desired degree to produce a wax having a hardness and melting point approximately the same as carnauba wax.

The optimum percentages of hard wax as well as the other materials in the composition can be determined by simple experimentation with the particular species of materials chosen from each class. It is preferred to impregnate the rayon yarn by dissolving the mixture of pitch, rosin and wax in a high-flash organic solvent such as Stoddard solvent and immerse the yarn in the solution for a sufficient time to pick up an amount of composition to the extent of from 8 to 12 percent the weight of the dried finish-treated twine after substantially all the solvent has evaporated. The composition must be so compounded as not to be tacky in the hot sun under normal field conditions of baling, while also being not too brittle under considerably colder climatic conditions, e. g., conditions of storage in an unheated barn during the winter months. Moreover, when the twine impregnated with dried finishing composition contains less than about 8 percent by weight of the composition, the knot strength is less than optimum and the yarn is more subject to abrasion from the hay or straw. When the mixture of dissolved ingredients of the finish solution comprises more than 12 percent of the weight of the dry finished twine, the twine tends to slip within the knots and produce loose bales. The preferred range within the acceptable range of 8 to 12 percent is 10 to 11 percent.

As illustrated in the drawing, the baler twine 1 is formed by twisting a plurality of coated yarns 2. Each yarn in turn is formed of a multiplicity of filaments 3 provided with the coating composition 4 which comprises from 50% to 75% asphalt, pyrogenous asphalt or coal-tar pitch, 20% to 40% rosin or modified rosin and 6% to 20% hard wax or a hard wax-like substance.

The following examples illustrate the invention and represent preferred embodiments thereof.

*Example 1*

Ten parts of a petroleum-derived microcrystalline wax (Sunoco Black Wax #985), comprising a major proportion of long chain hydrocarbons (e. g., $C_{40}$ to $C_{50}$) and a minor proportion of large molecular weight organic dark colored compounds containing oxygen, sulfur and nitrogen, 30 parts of a pentaerythritol ester of rosin (Pentalyn A) having a melting point around 110° C., and 60 parts of a petroleum-derived pitch (Hydrolene, manufactured by Sun Oil Company), having a melting point in the approximate range of 85 to 100° C. are blended into a homogeneous mixture while heated at about 120° C. Thereafter a twine finish solution was prepared by stirring Stoddard solvent into the mixture before it had cooled until a solution was obtained consisting by weight of approximately 80 percent solvent and 20 percent the mixture. The solvent has a boiling point at around 160° C. and before being stirred into the mixture, may be heated to some temperature substantially below its boiling point. Sixteen untwisted yarns, each comprising 980 filaments and measuring 2200 denier were passed as a single sheet through a dip tank containing some of the above described solution heated at about 70° C. Thereafter, the yarns passed through squeeze rolls to remove excess solution and were dried over rotating drums heated to about 120° C. to remove the solvent. Thereafter, the 16 yarns were twisted into a 15,680 filament strand or twine. Although the denier of 16 yarns adds up to 35,200 in an untwisted condition, on account of the twist in the strand, the strand of combined yarns approximates 36,000 denier. Of the twine thus formed, the ends of two lengths thereof were joined in a loop knot such as formed by the knotting mechanism of a conventional hay baler. The free ends of the test piece comprising the joined length of twine were anchored in a tensile test machine and the test piece including the knot was subjected to progressively greater tension until the piece broke within the knot at 120 pounds. No slipping of either length could be observed within the knot. A knot strength of 120 pounds is substantially above the minimum requirement of 90 pounds set by a leading manufacturer of hay baling machines.

*Example 2*

A twine finish solution was prepared by mixing while heated to about 120° C. 20 parts of a petroleum derived wax (Sunoco Black Wax #985), 20 parts of pentaerythritol ester of rosin (Pentalyn A), and 60 parts of a petroleum derived pitch (Hydrolene). The mixture while hot was slowly stirred into a bath of Stoddard solvent heated to about 100° C. until the resulting solution comprised 80 percent solvent and 20 percent of the mixture. The resulting twine finish solution was applied to sixteen 980 filament yarns in the same manner as described in Example 1. The resulting twine of approximately 36,000 denier was thereupon tested as described in Example 1. The knot of the test piece broke at 119 pounds and no slippage of the twine within the knot was observed.

*Example 3*

A twine finish solution was prepared in the same manner as described in Example 1 except that the ingredients of the mixture consisted of 10 parts of carnauba wax, 30 parts of Pentalyn A, and 60 parts of coal-tar type pitch or asphaltic material containing a small amount of phenol (Rulon R367). This material, sold by Ralph V. Rulon Inc. of Philadelphia, has a softening point of about 170° F. (76° C.), hardness (according to ASTM D5–49) indicated by a loaded steel needle of 30 tenths of a millimeter, and bitumen solubility in carbon disulfied of 99 percent or more. The phenol of the asphalt is useful in rendering the twine fungi-resistant. Yarns were treated and twine was formed therefrom and tested as described in Example 1. The twine had a knot strength of 113 pounds and no noticeable slipping of the twine occurred in the knot during the loading thereof.

*Example 4*

A twine finish solution was prepared in the same manner as described in Example 3 except that Hydrolene was used in place of Rulon R367. An approximately 36,000 denier twine was prepared in the same manner and tested as described for Examples 1 and 3. A knot strength of 116 pounds was obtained with no observable slipage of the twine within the knot prior to breaking of the strand within the knot.

*Example 5*

A twine finish solution was prepared in the same manner as described in Example 1 except that the ingredients of the mixture comprised 10 parts of a hydrogenated castor oil (No. 80 wax manufactured by Hangsterfer's Laboratories Inc.) having a hardness approximately that of carnauba wax, 30 parts of Pentalyn A, and 60 parts of Hydrolene. Yarns were treated with the finish solution and formed into a 35,000 denier twine as described in Example 1. The twine had a knot strength of 120 pounds and had no noticeable slippage within the knot prior to the breaking of the test piece.

All of the twine finishes produced in accordance with the foregoing examples were tested under actual field conditions for baling hay and straw. In the large scale field tests conducted, all bales that were tied after suitable adjustments of knotting mechanisms had been obtained, were tied in perfect condition and no ties were broken in transferring the bales from the field to storage. There was no evidence of fraying along the portions of the ties under tension and extending around the bales. The knots were properly formed and the ends cleanly cut.

An interesting fact resulting from these tests in the field was that nearly twice the number of bales could be tied with a ball of 36,000 denier rayon twine than could be tied from the same size ball of sisal fiber twine of equivalent knot strength having a length of 225 feet per pound. Although a sisal twine of this description has an average knot strength of approximately 120 pounds, the knot strength actually varies between 90 and 150 pounds due to the inability of the leading manufacturers thereof to produce twine of better uniformity. The rayon twine, on the other hand, is produced with relatively great uniformity and was found, on the basis of the rayon and sisal twines described above, to provide greater dependability and freedom from tie breakage than the sisal twine. Since a given weight of rayon twine ties many more bales than the same weight of sisal twine, replacement thereof in the baler may be made less frequently with consequently less shutting down for restocking the twine supply in the machine and less handling of twine in the course of a baling operation or harvest.

Furthermore, workers who handled bales of hay tied with the rayon twine of this invention reported that this twine was less abrasive to their hands. It has been further reported by farmers who have used the rayon twine described herein that there was no rodent or fungi damage to the rayon twine of bales tied therewith and that these bales withstood storage and handling thereafter with an unusually small percentage of the bales having broken ties.

Various changes and modifications may be made in practicing the invention without departing from the spirit and scope thereof and, therefore, the invention is not to be limited except as defined in the appended claims.

I claim:

1. A regenerated cellulose multi-filament strand comprising filaments coated with a composition which comprises, based on the weight of the composition, from 50 to 75 percent of a substance from the class consisting of pitches of coal and petroleum origin and mineral asphalts, 20 to 40 percent of a substance from the class consisting of rosin ester gum, maleic anhydride-modified rosin, and rosin modified with pentaerythritol, and from 6 to 20 percent of a hard wax, said composition imparting to the strand increased knot strength.

2. A rayon baling twine comprising filaments coated with a composition which constitutes from about 8 to 12 percent of the total dry weight of the coated twine and comprises, based on the weight of the composition, from 50 to 75 percent of a substance from the class consisting of pitches of coal and petroleum origin and mineral asphalts, from 20 to 40 percent of a substance from the class consisting of rosin ester gum, maleic anhydride-modified rosin, and rosin modified with pentaerythritol, and from 6 to 20 percent of a hard wax, said composition imparting increased knot strength to the twine.

3. A rayon baling twine comprising filaments coated with a composition which constitutes from 10 to 11 percent of the total dry weight of the coated twine and comprises, based on the weight of the composition, from 50 to 75 percent of a substance from the class consisting of pitches of coal and petroleum origin and mineral asphalts, from 20 to 40 percent of a substance from the class consisting of rosin ester gum, maleic anhydride-modified rosin, and rosin modified with pentaerythritol, and from 6 to 20 percent of a hard wax, said composition imparting increased knot strength to the twine.

4. A rayon baling twine as defined in claim 2 wherein the hard wax is one from the group consisting of carnauba wax and waxes having approximately the same hardness as carnauba wax.

5. A rayon baling twine as defined in claim 2 wherein the first-named ingredient of the composition is a petroleum pitch having a melting point in the range of 85 to 100° C.

6. A rayon baling twine as defined in claim 2 wherein the first-named ingredient of the composition is a coal tar pitch having a softening point in the range of 60 to 104° C.

7. A rayon baling twine comprising filaments coated with a composition which constitutes from about 8 to 12 percent of the total dry weight of the coated twine and comprises, based on the weight of the composition, from 50 to 75 percent of a substance from the class consisting of pitches of coal and petroleum origin and mineral asphalts, from 20 to 40 percent of pentaerythritol ester of rosin, and from 6 to 20 percent of a hard wax, said composition imparting increased knot strength to the twine.

8. A rayon baling twine as defined in claim 2 wherein the composition comprises 10 parts of a wax as described in Example 1, 30 parts of a pentaerythritol ester of rosin, and 60 parts of a petroleum-derived pitch having a melting point in the range of 85 to 100° C.

9. A rayon baling twine as defined in claim 2 wherein the composition comprises 20 parts of a wax as described in Example 1, 20 parts of a pentaerythritol ester of rosin, and 60 parts of a petroleum-derived pitch having a melting point in the range of 85 to 100° C.

10. A rayon baling twine as defined in claim 2 wherein the composition comprises 10 parts of carnauba wax, 30 parts of a pentaerythritol ester of rosin, and 60 parts of asphalt of coal-tar origin having a melting point of approximately 76° C. and a hardness of 30 as determined by test ASTM D5-49.

11. A rayon baling twine as defined in claim 2 wherein the composition comprises 10 parts of carnauba wax, 30 parts of a pentaerythritol ester of rosin, and 60 parts of a petroleum derived pitch having a melting point in the range of 85 to 100° C.

12. A rayon baling twine as defined in claim 2 wherein the composition comprises 10 parts of a hydrogenated vegetable oil having a hardness approximately that of carnauba wax, 30 parts of a pentaerythritol ester of rosin, and 60 parts of petroleum-derived pitch having a melting point in the temperature range of 85 to 100° C.

13. A rayon baling twine as defined in claim 2 wherein the uncoated filaments of the strand have a denier value in the range of 30,000 to 40,000.

14. A solution for coating a rayon filamentary strand adapting it for use as a baler twine comprising, on the basis of the combined weight of the following soluble ingredients, 50 to 75 percent of a substance from the class consisting of pitches of coal-tar and petroleum origin and mineral asphalts, from 20 to 40 percent of a substance from the class consisting of rosin ester gum, maleic anhydride-modified rosin, and rosin modified with pentaerythritol, and from 6 to 20 percent of a hard wax having a hardness of the order of 0.5 as determined by the standard test ASTM D5-49; said mixture being dissolved in a solvent therefor in an approximate weight ratio of 4 parts of the solvent to one part of the mixture.

References Cited in the file of this patent

UNITED STATES PATENTS

| | | |
|---|---|---|
| 336,718 | Horner | Feb. 23, 1886 |
| 2,105,087 | Lutz | Jan. 11, 1938 |
| 2,142,039 | Abrams | Dec. 27, 1938 |
| 2,290,833 | Keyser | July 21, 1942 |
| 2,376,797 | Miller | May 22, 1945 |
| 2,648,616 | Gauther | Aug. 11, 1953 |